(12) United States Patent
Doucet

(10) Patent No.: US 11,773,823 B2
(45) Date of Patent: Oct. 3, 2023

(54) TURBINE WALL APPARATUS/SYSTEM AND METHOD FOR GENERATING ELECTRICAL POWER

(71) Applicant: Airiva Renewables, Inc., Katonah, NY (US)

(72) Inventor: Joe D. Doucet, Brooklyn, NY (US)

(73) Assignee: Airiva Renewables, Inc., Katonah, NY (US)

( * ) Notice: Subject to any disclaimer, the term of this patent is extended or adjusted under 35 U.S.C. 154(b) by 0 days.

(21) Appl. No.: 18/093,892

(22) Filed: Jan. 6, 2023

(65) Prior Publication Data

US 2023/0151795 A1    May 18, 2023

Related U.S. Application Data

(63) Continuation of application No. 17/970,074, filed on Oct. 20, 2022.

(60) Provisional application No. 63/277,827, filed on Nov. 10, 2021.

(51) Int. Cl.
| | | |
|---|---|---|
| *F03D 3/02* | (2006.01) | |
| *F03D 9/25* | (2016.01) | |
| *F03D 3/00* | (2006.01) | |

(52) U.S. Cl.
CPC ............... *F03D 3/02* (2013.01); *F03D 3/005* (2013.01); *F03D 9/25* (2016.05); *F05B 2220/706* (2013.01); *F05B 2240/213* (2013.01); *F05B 2240/40* (2013.01)

(58) Field of Classification Search
CPC ... F03D 3/02; F03D 3/005; F03D 9/25; F05B 2220/706; F05B 2240/213

USPC ..................................................... 290/44, 55
See application file for complete search history.

(56) References Cited

U.S. PATENT DOCUMENTS

| | | | |
|---|---|---|---|
| 4,220,870 A * | 9/1980 | Kelly ...................... | F03D 13/20 |
| | | | 416/DIG. 4 |
| 5,272,378 A | 12/1993 | Wither | |
| 9,752,556 B1 | 9/2017 | Al-Saud et al. | |
| 10,451,044 B1 | 10/2019 | Lentini | |
| 2003/0168864 A1* | 9/2003 | Heronemus ............. | F03D 9/255 |
| | | | 290/55 |
| 2007/0264116 A1 | 11/2007 | Dempster | |
| 2009/0015015 A1* | 1/2009 | Joutsiniemi ............... | F03D 3/02 |
| | | | 290/52 |
| 2009/0224552 A1 | 9/2009 | Sulentic | |

(Continued)

FOREIGN PATENT DOCUMENTS

| | | |
|---|---|---|
| CN | 201288633 Y | 8/2009 |
| CN | 201301780 Y | 9/2009 |

(Continued)

OTHER PUBLICATIONS

International Search Report and Written Opinion for PCT/US2021/064432 dated Mar. 9, 2022.

*Primary Examiner* — Charles Reid, Jr.
(74) *Attorney, Agent, or Firm* — Thompson Coburn LLP

(57) ABSTRACT

Techniques are disclosed where a plurality of bladed shafts are arranged in an adjacent relationship to one another within a frame. The blades of the shafts are capable of interacting with moving air and causing rotation of the shafts. Rotational energy of the shafts is converted to electrical energy by electrical equipment stored within a portion of the frame. The electrical energy is conditioned and output as usable electrical power.

21 Claims, 16 Drawing Sheets

(56) References Cited

U.S. PATENT DOCUMENTS

| | | |
|---|---|---|
| 2010/0225118 A1 | 9/2010 | Micu |
| 2013/0239861 A1 | 9/2013 | Gizara |
| 2016/0276896 A1 | 9/2016 | Morrison |
| 2017/0002793 A1 | 1/2017 | Collins |
| 2017/0321657 A1 | 11/2017 | Clemo |
| 2018/0003156 A1 | 1/2018 | Christ et al. |
| 2018/0102690 A1 | 4/2018 | Martinez Ruvalcaba |
| 2020/0200144 A1 | 6/2020 | Thumbar |

FOREIGN PATENT DOCUMENTS

| | | |
|---|---|---|
| CN | 106150909 A | 11/2016 |
| KR | 20060128323 A | 12/2006 |
| WO | 2012113130 A1 | 8/2012 |
| WO | 2020089330 A1 | 5/2020 |

* cited by examiner

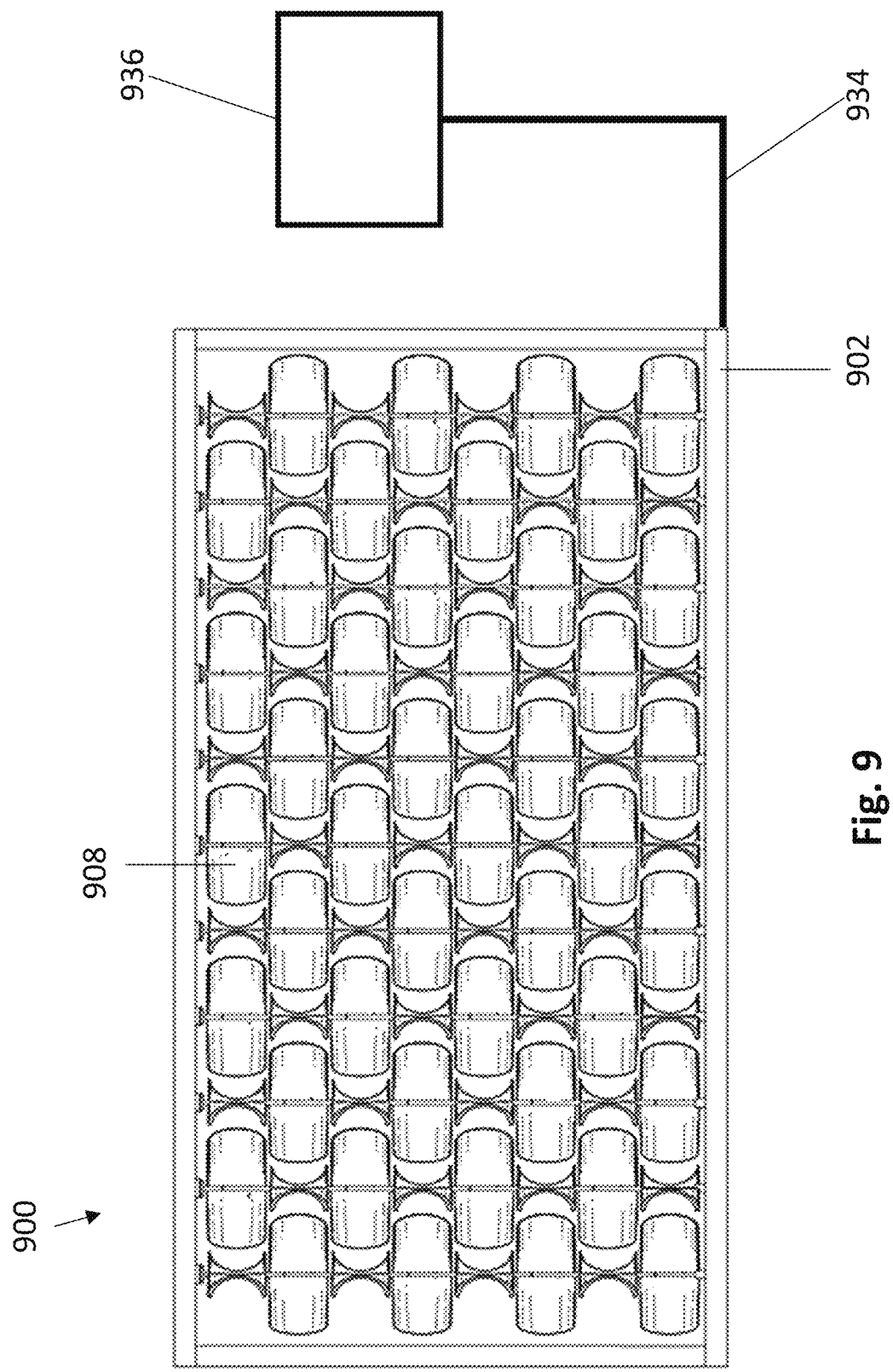

TURBINE WALL APPARATUS/SYSTEM AND METHOD FOR GENERATING ELECTRICAL POWER

RELATED APPLICATION DATA

This application is a continuation of U.S. application Ser. No. 17/970,074, filed Oct. 20, 2022, which claims the benefit of U.S. Provisional Application No. 63/277,827, filed Nov. 10, 2021, the disclosure of which is incorporated by reference herein.

INTRODUCTION

Energy consumption is and will continue to be an important aspect of human society. While alternative energy systems such as solar- and wind-energy have gained viability and adoption, there remains a need for systems with increased efficiency and flexibility. For example, conventional solar energy systems require large amounts of installation space and must be oriented to face a certain direction relative to the sun in order to reap the most benefits. And wind energy systems often require tall towers which generate noise and can be unsightly.

SUMMARY

In an effort to improve upon these shortcomings in the art, the inventors disclose a wind turbine wall apparatus, system and method for generating electrical power, the wind turbine wall comprising a plurality of shafts, each shaft comprising a plurality of blades. The blades catch moving air (e.g., wind), causing rotation of the shaft, and the translated rotational movement of the shafts drives electrical equipment to produce electrical energy. The generated electrical energy can then be collected/distributed in the desired manner. The combination of the shaft, blades and electrical equipment may be referred to as a turbine. The various turbines and associated electrical components are encompassed by and/or enclosed within a frame, such that the overall wind turbine wall comprises an installable unit that is capable of generating electrical power with improved efficiency and appearance over conventional alternative energy systems, and is capable of being utilized in a variety of installation settings.

In one example embodiment, the inventors disclose a moving air turbine apparatus that comprises a frame, a plurality of shafts arranged and configured to be received in the frame where each shaft comprises a set of blades configured to rotate about a respective shaft axis. The plurality of blades comprises the combination of each set of blades of each shaft. The plurality of blades is arranged and configured to interact with moving air to cause rotational movement of a respective shaft of the plurality of shafts about the respective shaft axis. Electrical equipment is operatively coupled to at least one shaft of the plurality of shafts. The electrical equipment is arranged and configured to translate rotational movement of a respective shaft about the shaft axis for conversion to electrical energy, and circuitry is arranged and configured to convert the electrical energy generated by the electrical equipment to output electrical power.

In another embodiment, a moving air turbine apparatus comprises a frame, a plurality of shafts arranged and configured to be received in the frame, where each shaft comprises a set of blades that is configured to rotate about a respective shaft axis. A plurality of blades comprises the combination of each set of blades of each shaft. The plurality of blades is arranged and configured to interact with moving air to cause rotational movement of a respective shaft of the plurality of shafts. A plurality of generators is provided. Each generator is operatively coupled to a respective shaft of the plurality of shafts so as to be arranged as a shaft/generator pair. Each shaft/generator pair is configured such that the generator converts rotational movement of the shaft about the shaft axis to electrical energy, and circuitry is configured to convert the electrical energy generated by the generator to output electrical power.

In another embodiment, a turbine system comprises a frame comprising an upper portion, a lower portion, and side portions between the upper and lower portions. The lower portion is configured to be parallel to a surface to which the turbine system is capable of being installed. A plurality of turbines is arranged and configured to be received in the frame such that the turbines are capable of rotation within the frame. Each turbine comprises a shaft including a plurality of blades and configured to rotate about a respective shaft axis. Each shaft axis is perpendicular to the lower portion of the frame, wherein the frame comprises electrical equipment arranged within the lower portion of the frame and configured to be operatively coupled to the turbines such that the electrical equipment converts rotational energy of the turbines to electrical energy for output as electrical power.

In another embodiment, a turbine system comprises a frame comprising an upper portion, a lower portion, and side portions between the upper and lower portions. The lower portion is configured to be parallel to a surface to which the turbine system is capable of being installed, and a plurality of turbines is arranged and configured to be received in the frame such that the turbines are capable of rotation within the frame. Each turbine comprises (i) a shaft including a plurality of blades and being configured to rotate about a respective shaft axis. Each shaft axis is perpendicular to the lower portion of the frame, and (ii) a generator is operatively coupled to the shaft, wherein the generators are arranged and configured to convert rotational energy of the respective turbine to electrical energy for output as electrical power.

Another embodiment comprises a method for generating electrical power comprising installing an array of wind turbines in a frame, where the wind turbines are positioned in a side-by-side manner within the frame such that any one wind turbine of the array is configured in a cooperative airflow relationship with any immediately adjacent wind turbine of the array. In one aspect of the method, rotational energy of any one wind turbine is converted to electrical energy. In another aspect of the method, the electrical energy in conditioned to electrical power. In another aspect of the method, the electrical power is distributed to power receiving equipment.

In the above embodiments, the blades may be S-shaped, helix-shaped, Savonius-type blades, or Darrieus-type blades, for example. The blades may be coupled to the shaft, or integrally formed with the shaft, for example. The circuitry may include rectification circuitry and/or conditioning circuitry configured to reduce variances in the electrical energy, for example. The shafts may comprise a bearing assembly at opposite ends of the shaft, wherein the bearing assemblies are positioned within opposing portions of the frame, for example. The shaft axes may be perpendicular to a lower portion of the frame, for example. The electrical power may be DC or AC, for example. The electrical equipment may comprise a DC or AC generator, which generates DC or AC electrical energy accordingly, or example.

These and other features and advantages of the present invention will be apparent to those having ordinary skill in the art upon review of the teachings in the following description and drawings.

BRIEF DESCRIPTION OF THE DRAWINGS

FIG. 9 depicts a real-world installation according to one embodiment of the wind turbine wall.

DETAILED DESCRIPTION OF EXAMPLE EMBODIMENTS

A number of example embodiments are described for the wind turbine wall.

Figure 1:
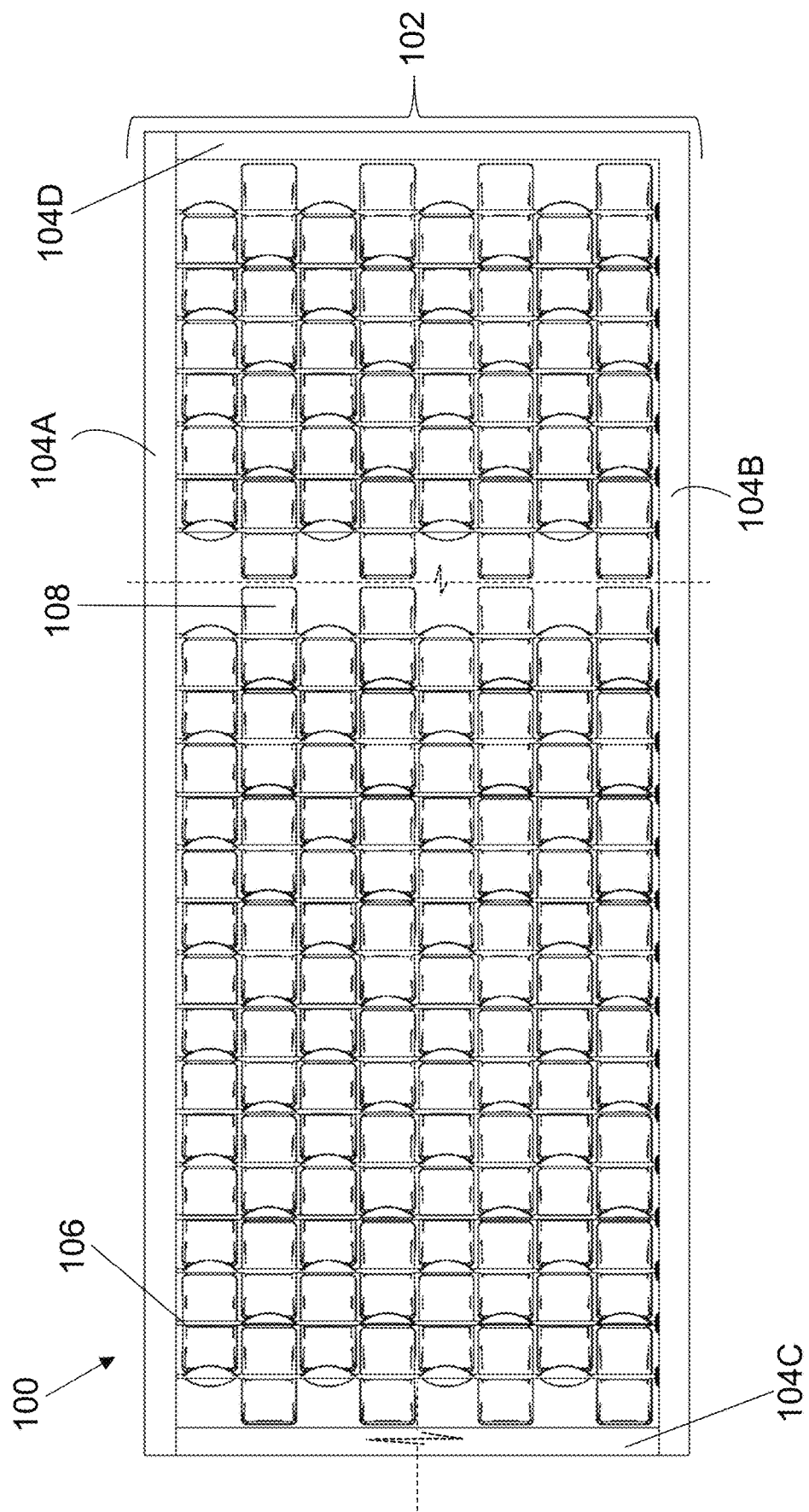
FIG. 1 depicts a front view of one embodiment of a wind turbine wall with a conventional break line and a column of blades removed to show that the wall may be any length and width.

FIG. 1 shows an embodiment of a wind turbine wall 100, comprising a generally rectangular, hollow frame 102. Upper portion 104A and lower portion 104B of the frame may be longer in length than side portions 104C, 104D. The lower portion 104B is configured to be positioned on the ground or other support surface (e.g., rooftop) for installation of the frame on the surface where the frame will rest. The portions 104A to 104D of the frame 102 may be configured with holes (not shown) and/or other hardware fixtures (e.g., hooks/eyelets, not shown) for use in securing the frame to its desired location within an installation space. For example, the lower portion 104B may be configured (e.g., with holes) to receive fasteners such as bolts, washers, etc. for securing the frame to the ground or other installation surface. The other portions of the frame may also be used to anchor and/or secure the frame to other objects (e.g., to adjacent walls, trees, etc.) in the installation environment (e.g., via eyelets/hooks and the like that receive the end of a cable for securing the frame to other objects within the installation environment of the frame).

Arranged within the frame 102 (e.g., extending vertically between upper and lower portions 104A, 104B) is a plurality of shafts 106, configured to be able to rotate about an axis in a perpendicular manner relative to the installation surface, via respective bearings associated with shaft(s) and located within corresponding portions of the frame. For example, the shafts 106 may have a bearing assembly at each end (e.g., an upper bearing assembly and a lower bearing assembly) to enable rotation.

Each individual shaft 106 includes a plurality of blades 108. The blades 108 on any one shaft 106 may be arranged in alternating perpendicular fashion relative to one another. Blades 108 on adjacent shafts 106 may be configured operatively relative to blades 108 on adjacent so as to optimize airflow properties. The pattern of the shafts and blades may be described in terms of columns and rows, wherein the columns comprise the vertical configuration of blades on any one shaft, and the rows comprise the horizontal configuration of blades of all shafts. For example, the blades of one shaft may catch the wind and rotate relative to blades of an adjacent shaft such that gaps between adjacent blades in the same row are minimized. In one embodiment, the blades may be non-movably fixed to the respective shaft via set screws, welding, mechanical fasteners, overmolding and other like techniques. The blades and shaft may alternatively be an integral structure, such that the blades need not be separately fixed to the shaft because they are formed with the shaft in a unitary manner (e.g., via molding).

Figure 2:
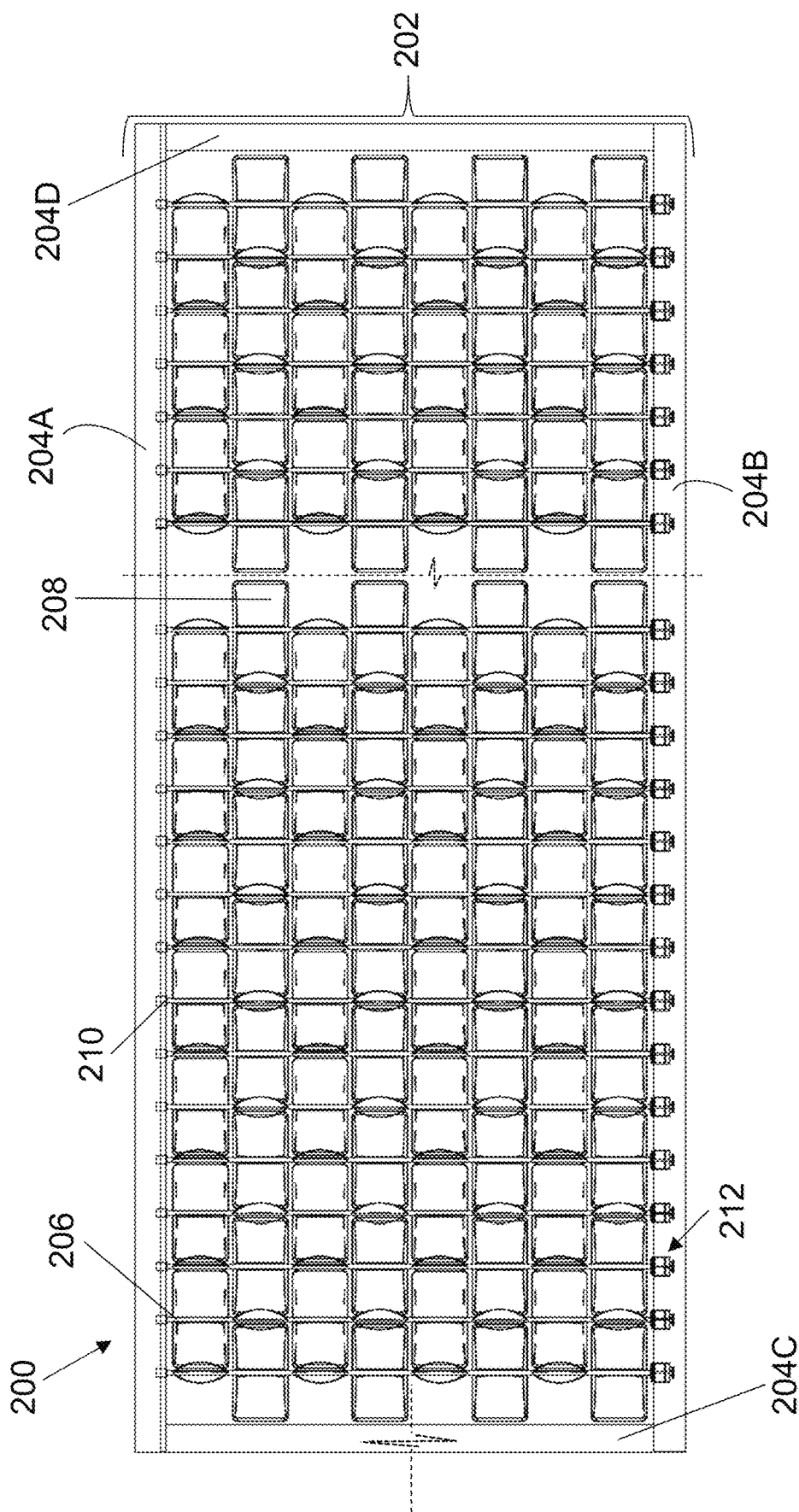
FIG. 2 illustrates the same view as the embodiment in FIG. 1 but with a transparent frame.

FIG. 2 illustrates the same view as FIG. 1 but with the frame being transparent so as to show various other aspects of the shafts relative to the frame (subsequent figures include like numbering of like parts relative to preceding figures, e.g., 100 in FIG. 1 is 200 in FIG. 2, and so on and so forth for other figures, where appropriate). As shown in the wind turbine wall 200 of FIG. 2, the shafts 206 include an upper rotation assembly 210 in upper portion 204A of frame 202 and a lower rotation assembly 212 in lower portion 204B of frame 202. Sides 204C and 204D are configured in the same manner as in FIG. 1. The upper rotation assembly 210 may comprise a bearings assembly configured to allow for rotation of the shaft 206. The lower rotation assembly 212 may comprise a bearings assembly as well as a generator for converting the mechanical (rotational) energy of the shaft to electrical energy for producing electrical power. The combination of the shaft, blades, and upper and lower rotation assemblies may be referred to as a turbine. Thus, the frame may comprise a number of turbines, such number being limited by the size of the blades and the size of the overall frame.

Figure 3A:
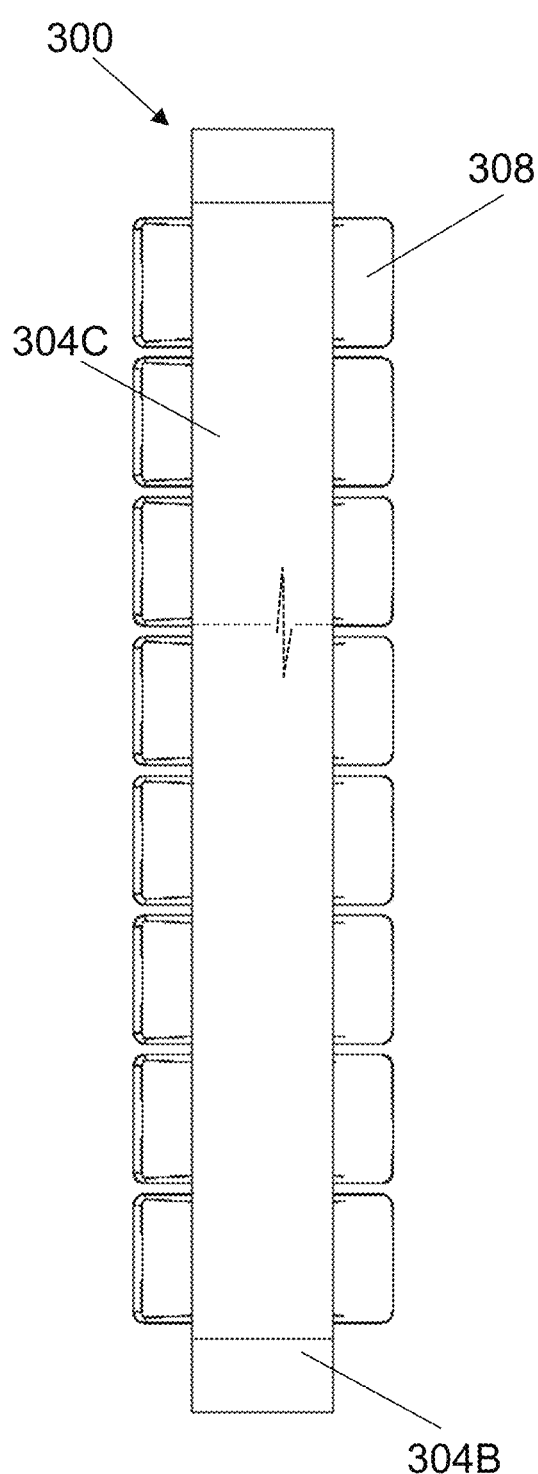
FIG. 3A depicts a side view of the embodiment of FIGS. 1 and 2.
Figure 3B:
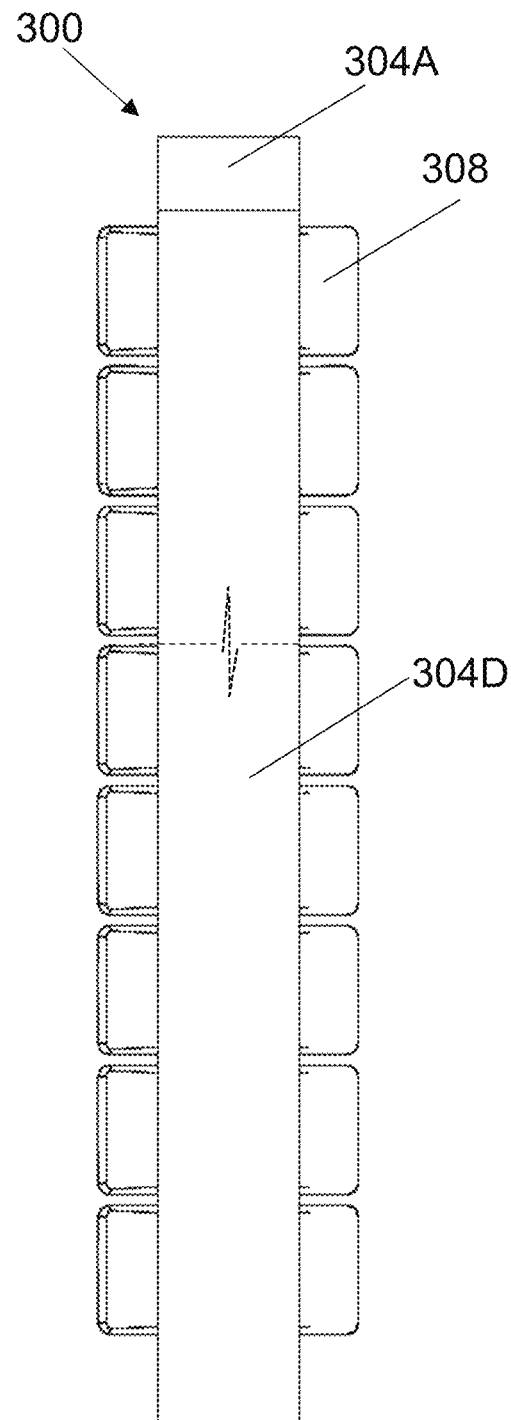
FIG. 3B depicts a different side view of the embodiment of FIGS. 1 and 2.

FIGS. 3A and 3B illustrate side views of the wind turbine wall 300. FIG. 3A shows wind turbine wall 300 including lower portion 304B, side portion 304C and blades 308. FIG. 3B shows wind turbine wall 300 including upper portion 304A, side portion 304D, and blades 308. The portions 304A to 304D may comprise four separate sides that are coupled together, or two "L"-shaped portions that are coupled together, or other like configurations (e.g., one "L"-shaped portion and two other side portions). For example, portions 104B/204B/304B and 104D/204D/304D may comprise an "L"-shaped portion whereas portions 104A/204A/304A and 104C/204C/304C may comprise individual portions. Fewer individual portions may be used to reduce the need for coupling hardware and/or to reduce visible seams or for other mechanical efficiencies/ratings (e.g., it may be preferable to use two "L"-shaped portions rather than four individual portions to reduce seams and/or arrive at as desired strength of the frame). The portions 304A to 304D may comprise four separate sides that are coupled together, or two "L"-shaped portions that are coupled together, or other like configurations (e.g., one "L"-shaped portion and two other side portions). The wall may also be modular to allow fewer or more wall portions to be assembled together to form the wind turbine wall.

Figure 4A:
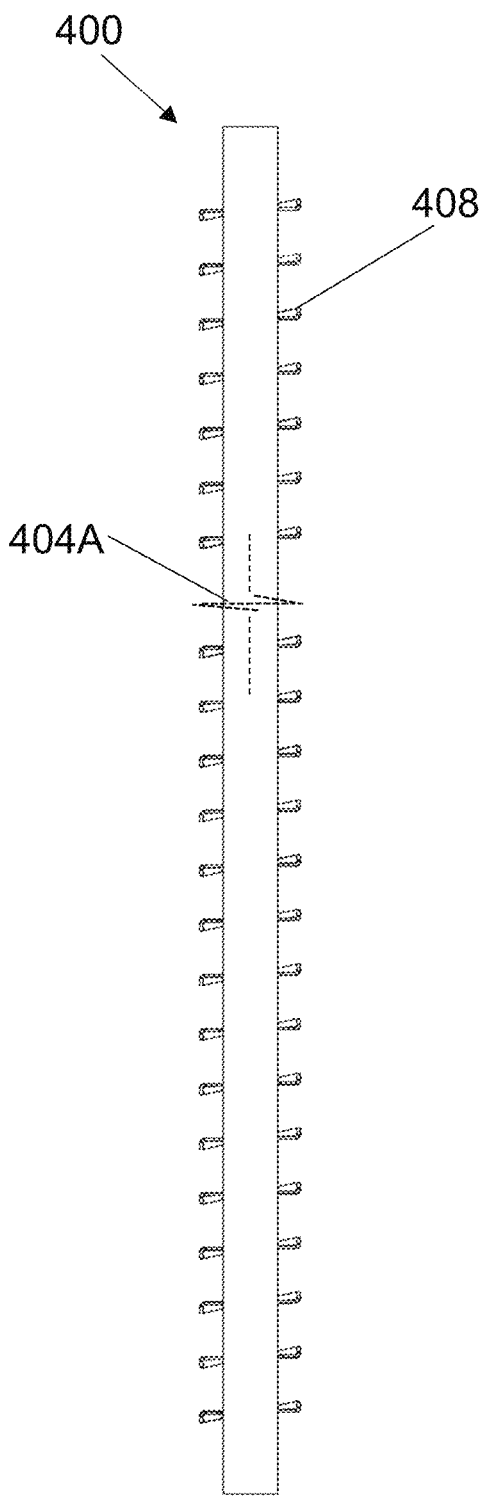
FIG. 4A depicts a top view of the embodiment of FIGS. 1 and 2.
Figure 4B:
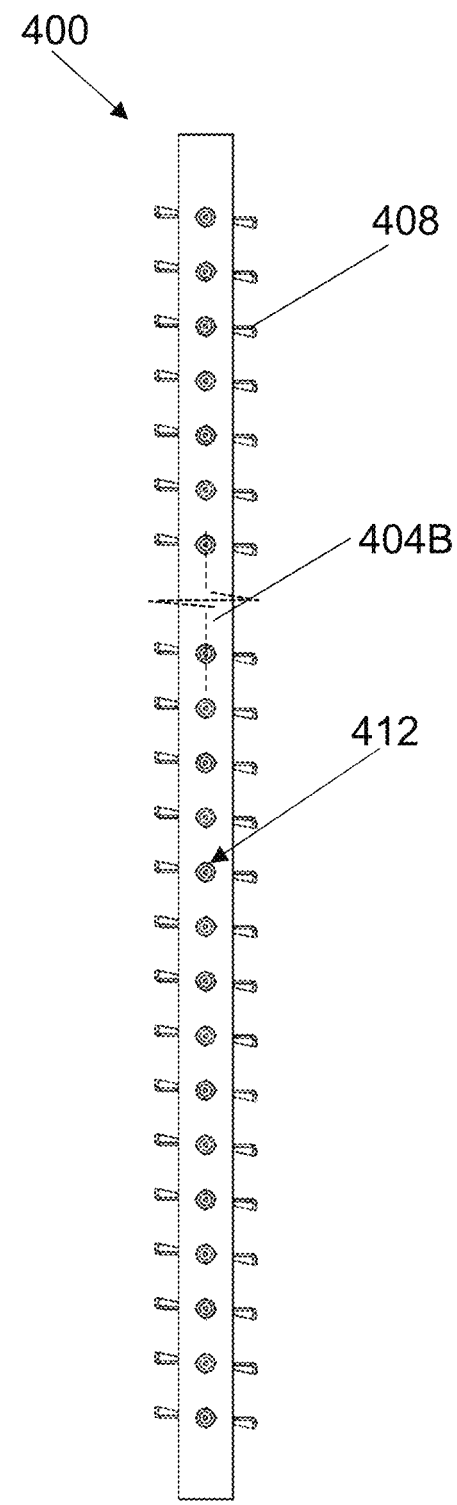
FIG. 4B depicts a bottom view of the embodiment of FIGS. 1 and 2.

FIGS. 4A and 4B illustrate top and bottom views of the wind turbine wall 400. FIG. 4A shows wind turbine wall 400 including upper portion 404A and blades 408. FIG. 4B shows wind turbine wall 400 including lower portion 404B, blades 408 and lower rotation assemblies 412.

Figure 5:
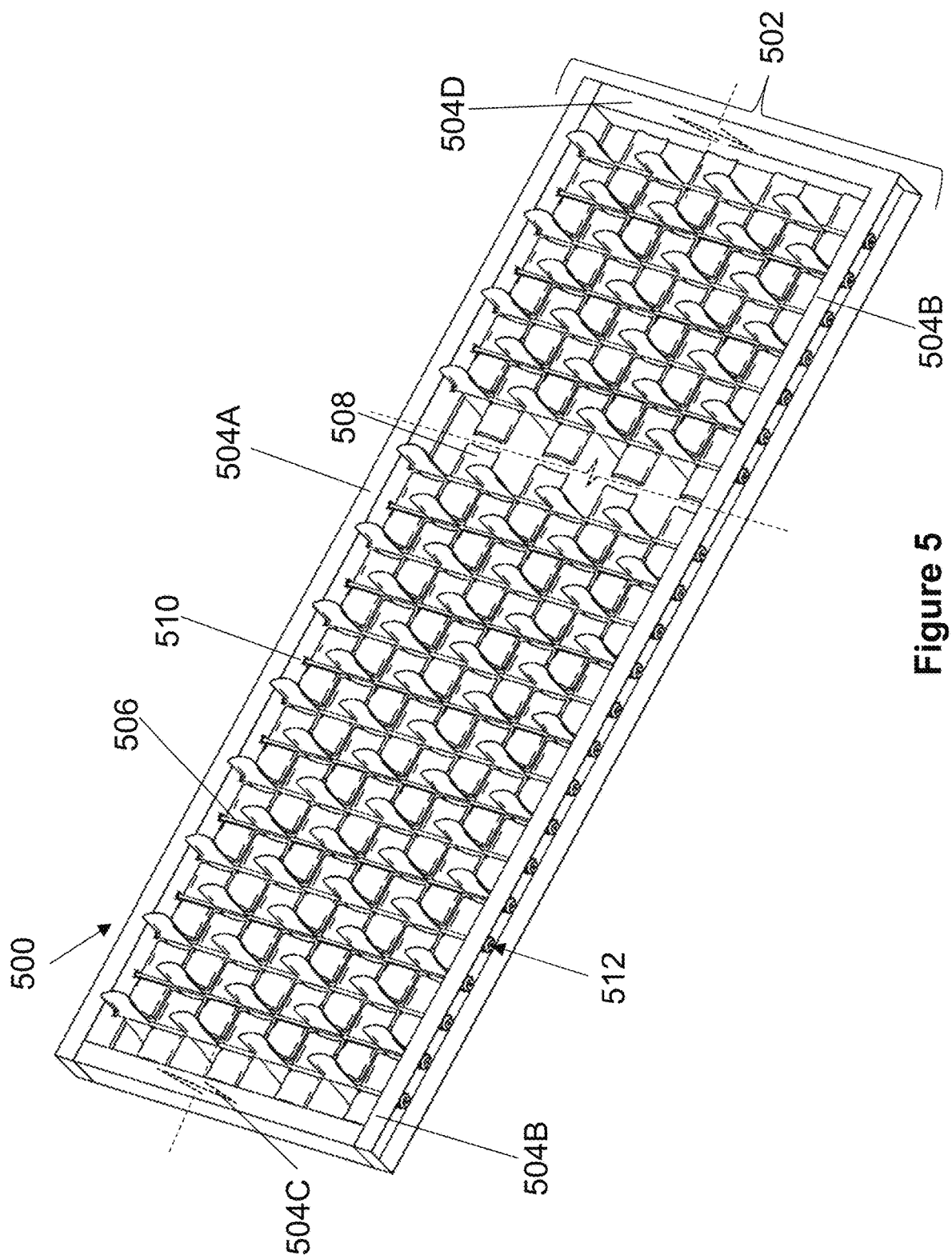
FIG. 5 depicts a bottom-centric perspective view of the embodiment of FIGS. 1 and 2.

FIG. 5 illustrates a bottom-centric perspective view of wind turbine wall 500. The frame 502 comprises portions 504A, 504B, 504C and 504D according to prior embodiments. While lower portion 504B is shown as not having a portion covering lower rotation assemblies 512, there may be a panel present that fills that space shown on the bottom side of portion 504B so as to protect the assemblies 512, and/or assist with mounting of the frame 500 to the intended support surface.

Figure 6A:
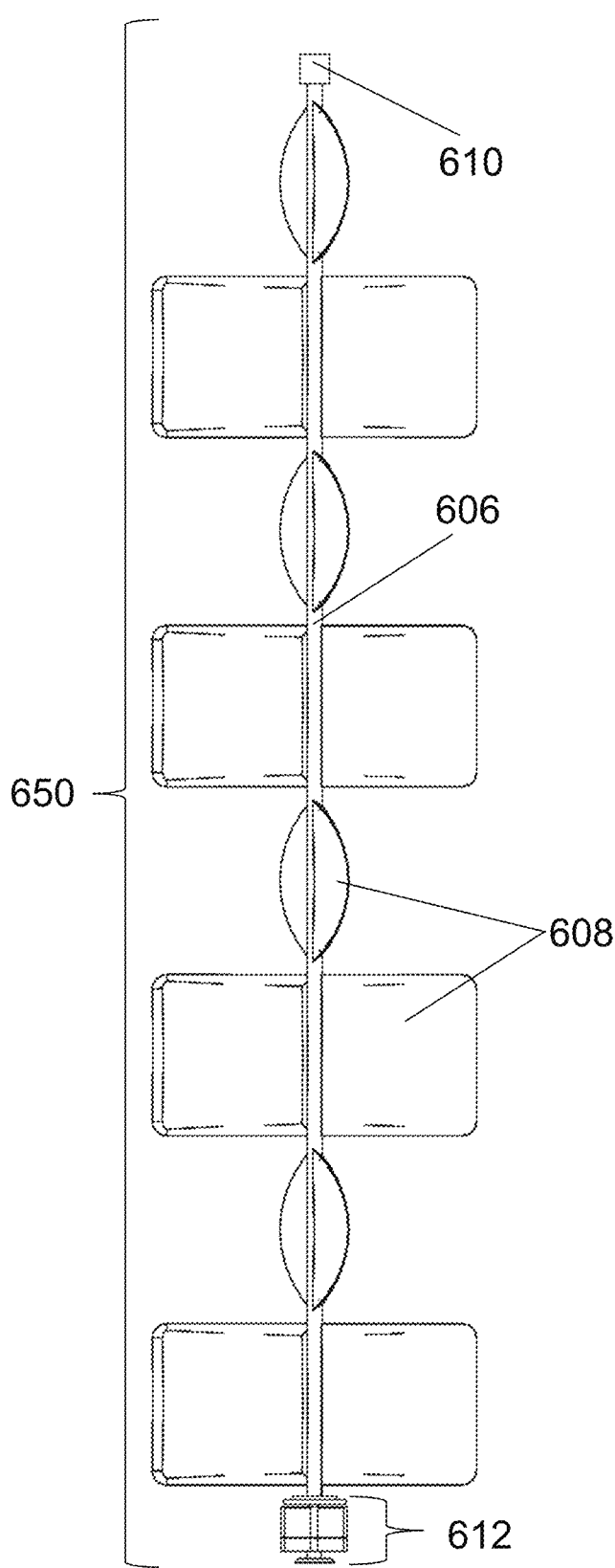
FIG. 6A depicts a turbine assembly of the embodiment of FIGS. 1-5.
Figure 6B:
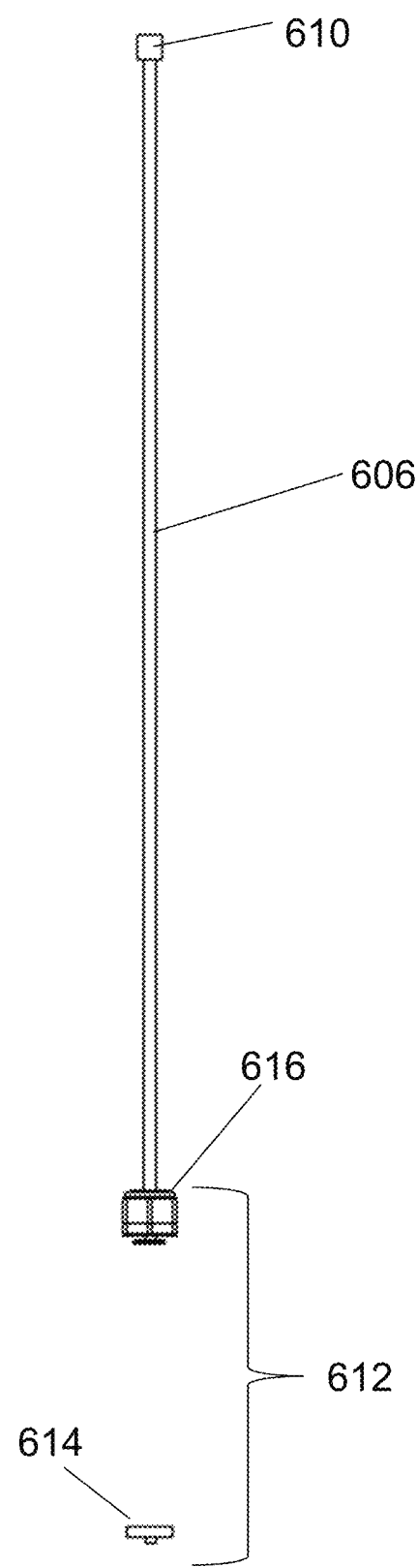
FIG. 6B depicts the turbine assembly of FIG. 6A without blades and with an exploded rotation assembly.
Figure 6C:
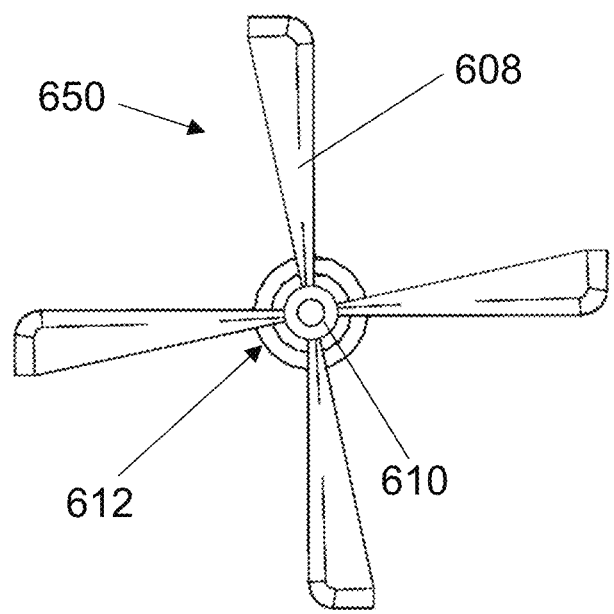
FIG. 6C depicts a top view of the turbine assembly of FIG. 6A.
Figure 6D:
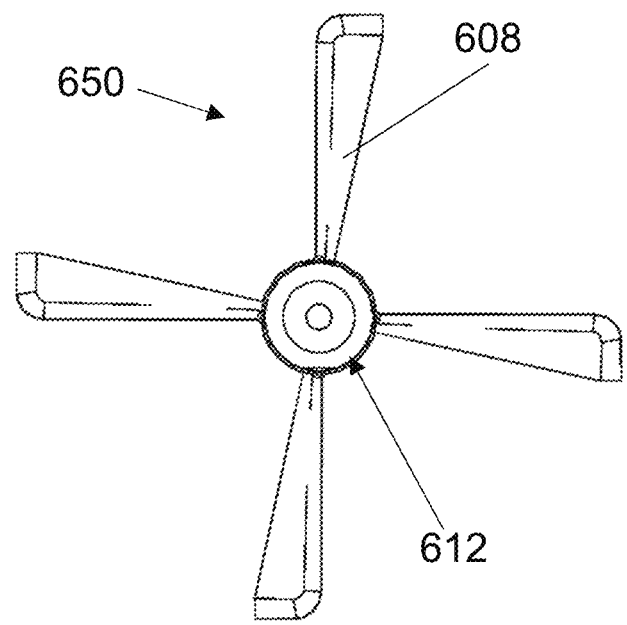
FIG. 6D depicts a bottom view of the turbine assembly of FIG. 6A.
Figure 6E:
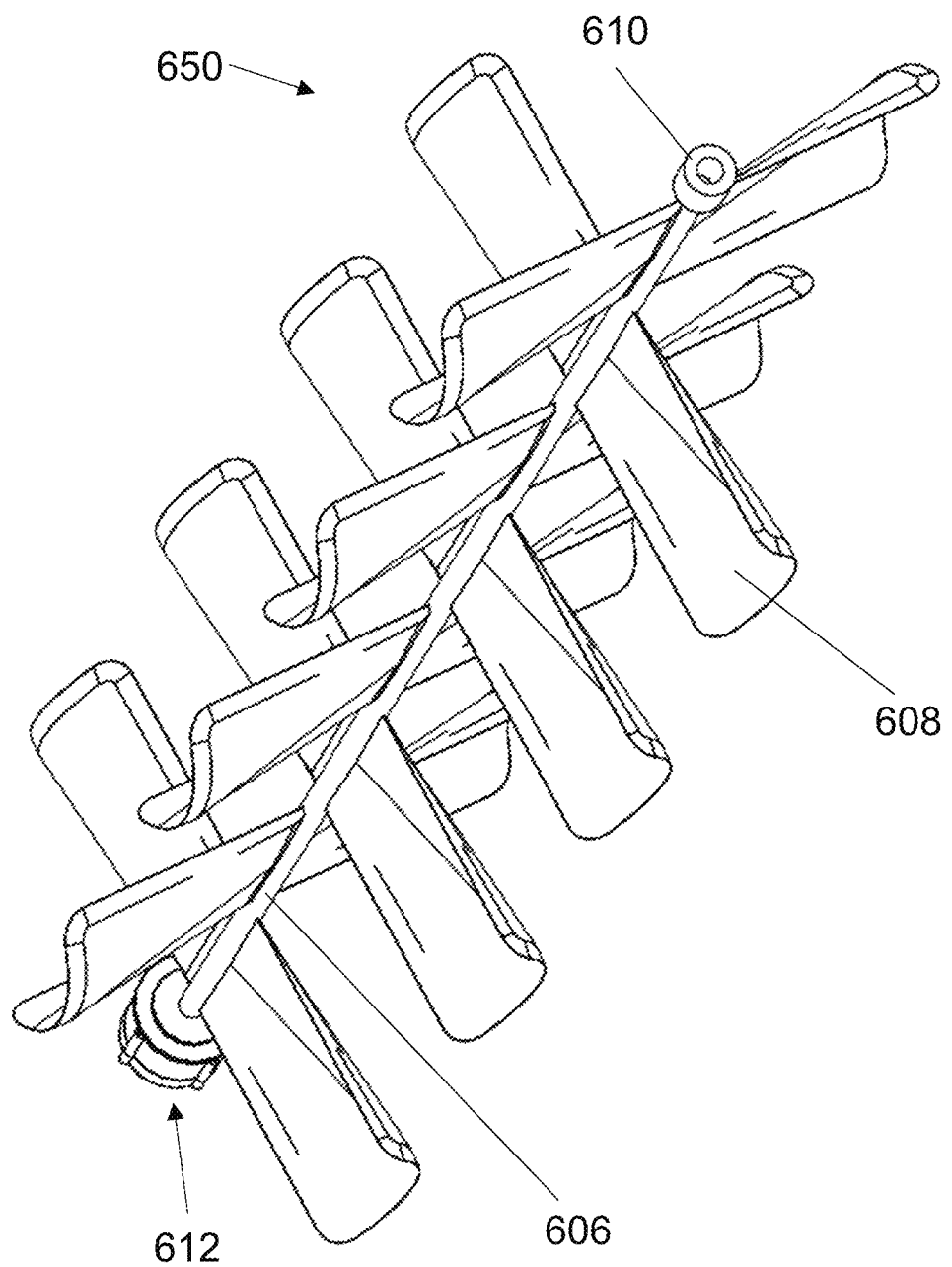
FIG. 6E depicts a perspective view of the turbine assembly of FIG. 6A.
Figure 6F:
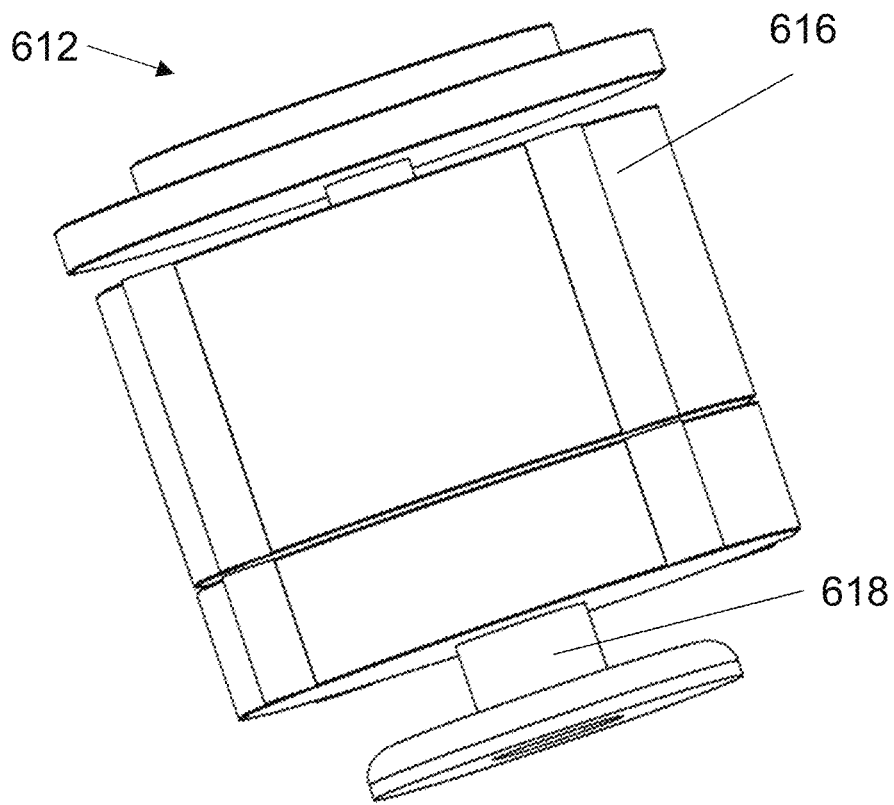
FIG. 6F depicts a perspective view of a rotation assembly.
Figure 6G:
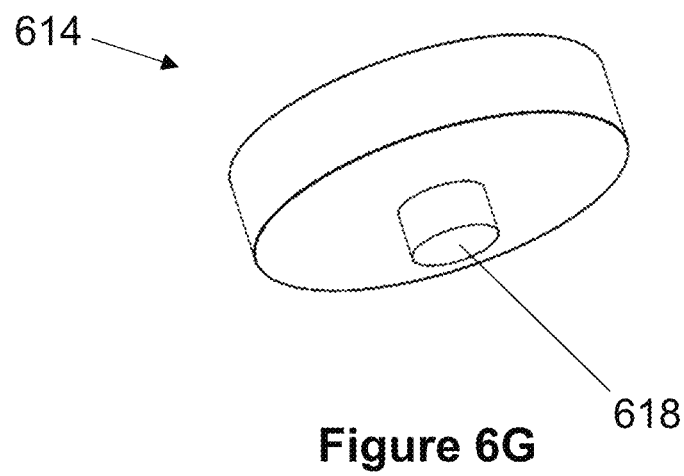
FIG. 6G depicts a perspective view of a bearing of the rotation assembly of FIG. 6F.

FIGS. 6A to 6G illustrate aspects of vertical axis turbine assembly 650 comprising shaft 606, blades 608, upper rotation assembly 610, and lower rotation assembly 612. FIG. 6B illustrates shaft 606 without blades 608 and with lower rotation assembly 612 exploded to show bearing 614 and generator 616. FIG. 6C illustrates a top view of assembly 650, and FIG. 6D represents a bottom view of assembly 650. FIG. 6E illustrates a top-centric perspective view of the turbine assembly 650. FIG. 6F illustrates a perspective view of lower rotation assembly 612, including a depiction of a protrusion 618 of bearing 614 relative to generator 616. FIG. 6G illustrates a perspective view of bearing 614 of the lower rotation assembly 612, including protrusion 618 that is configured to assist in the rotational functions of the lower rotation assembly.

Figure 7:
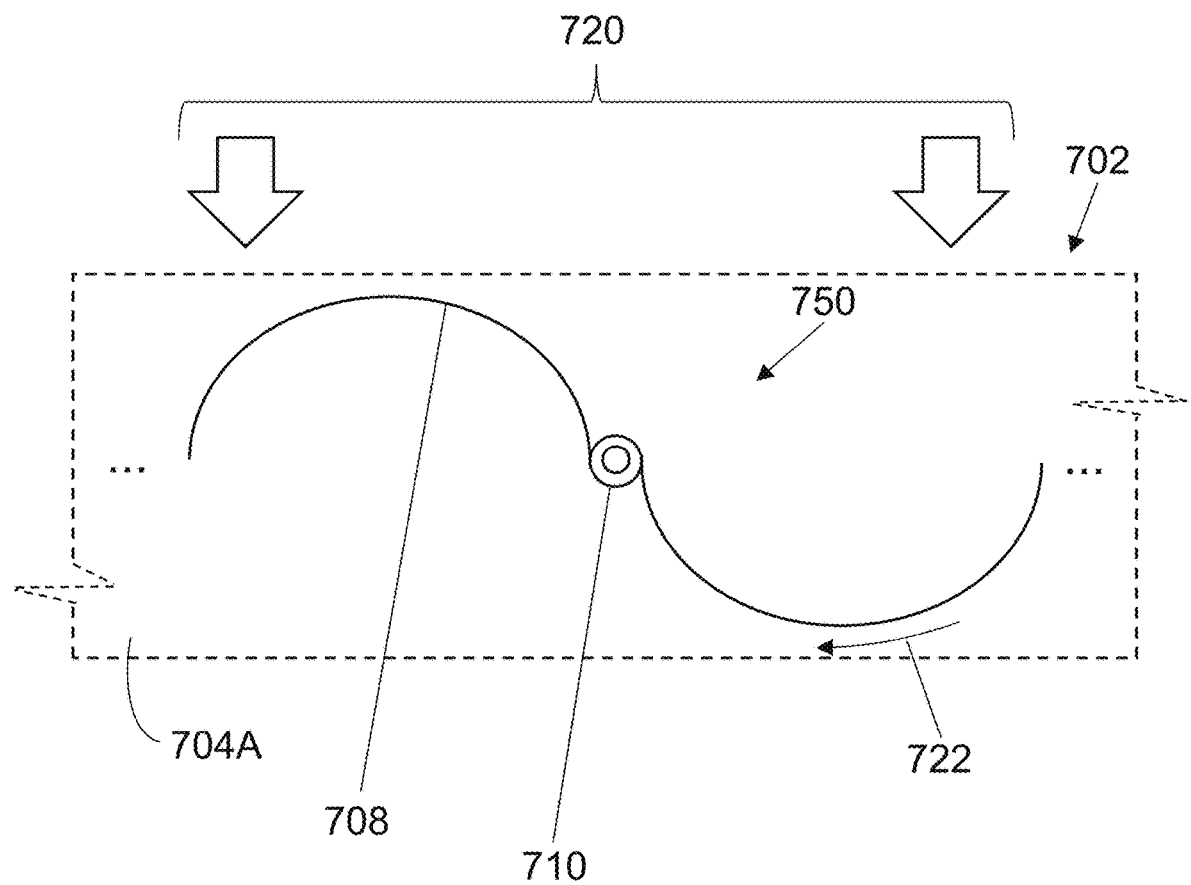
FIG. 7 depicts a wind flow and rotation schematic of a blade according to one embodiment of the wind turbine wall.

FIG. 7 illustrates example airflow aspects according to one embodiment of the wind turbine wall. A partial top view of frame 702 is depicted in dashed lines, and showing upper frame portion 704A. Bearing 710 of a turbine assembly 750, as well as an example blade 708 of the assembly 750, are visible beneath portion 704A. Wind flow direction 720 (as represented by the bracketed arrows) imparts force on the two sides/halves of the blade 708 to create rotation 722 (see arrow). The ellipsis ( . . . ) shown on either side of blade 708 in FIG. 7 signifies an adjacent turbine (e.g., another assembly 750).

Figure 8A:
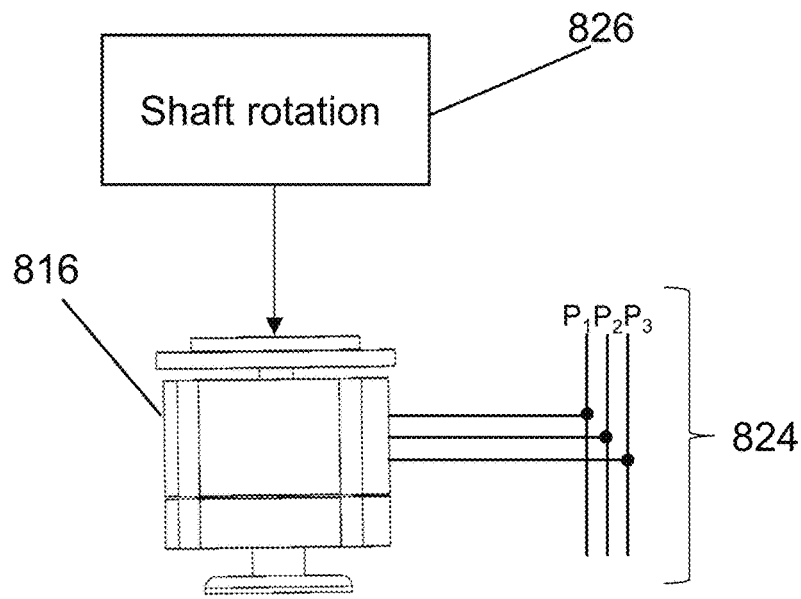
FIG. 8A depicts a schematic showing an AC output from a generator according to one embodiment of the wind turbine wall.
Figure 8B:
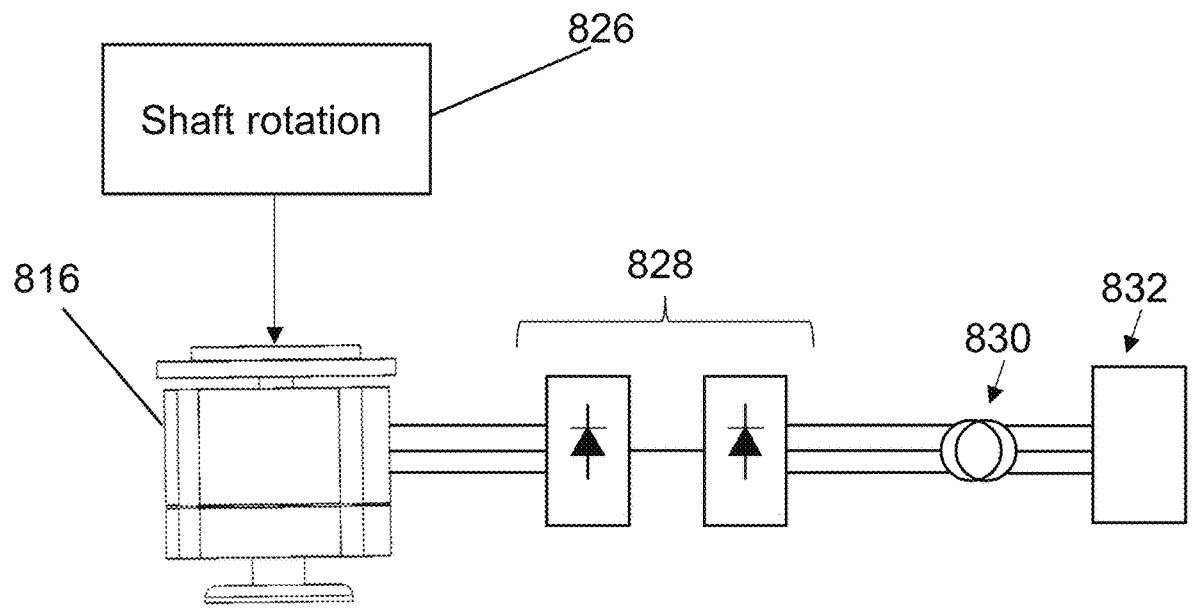
FIG. 8B depicts a schematic showing an AC/DC/AC configuration according to one embodiment of the wind turbine wall.

FIG. 8A illustrates an embodiment where generator 816 is an AC generator and outputs a 3-phase (e.g., $P_1$, $P_2$, $P_3$) AC output 824 due to rotation 826 of the shaft (not shown) coupled thereto. FIG. 8B illustrates an AC/DC/AC configuration where the output from generator 816 may be converted via rectification circuitry 828, and then the output from the circuitry 828 is converted to AC via transformer 830, so that the output from transformer 830 is compatible for direct grid connection to the local power grid 832. While not shown, and alternatively, the generator 816 may be a DC generator that outputs DC, and the embodiment in FIG. 8B may only be an AC/DC configuration such that the output is DC (e.g., no need for transformer 830). Such DC output may be used, for example, to directly feed a battery associated with the system. For example, in such a DC embodiment, the grid 832 would instead be a battery.

FIG. 9 illustrates wind turbine wall 900, where the output of the system 900 is connected via a cable raceway 934 that exits frame 902 and is connected to a power unit 936. The power unit 936 may, for example, comprise a battery unit capable of storing the (e.g., DC) output from the wind turbine wall, or a junction box that is connected to the local power grid if the output from 900 is AC. In either case, cable raceway 934 and power unit 936 comprise the necessary electrical and electronic components to achieve desired power conversion and/or distribution. FIG. 9 also illustrates the cooperative airflow relationship between adjacent blades 908.

Figure 10:
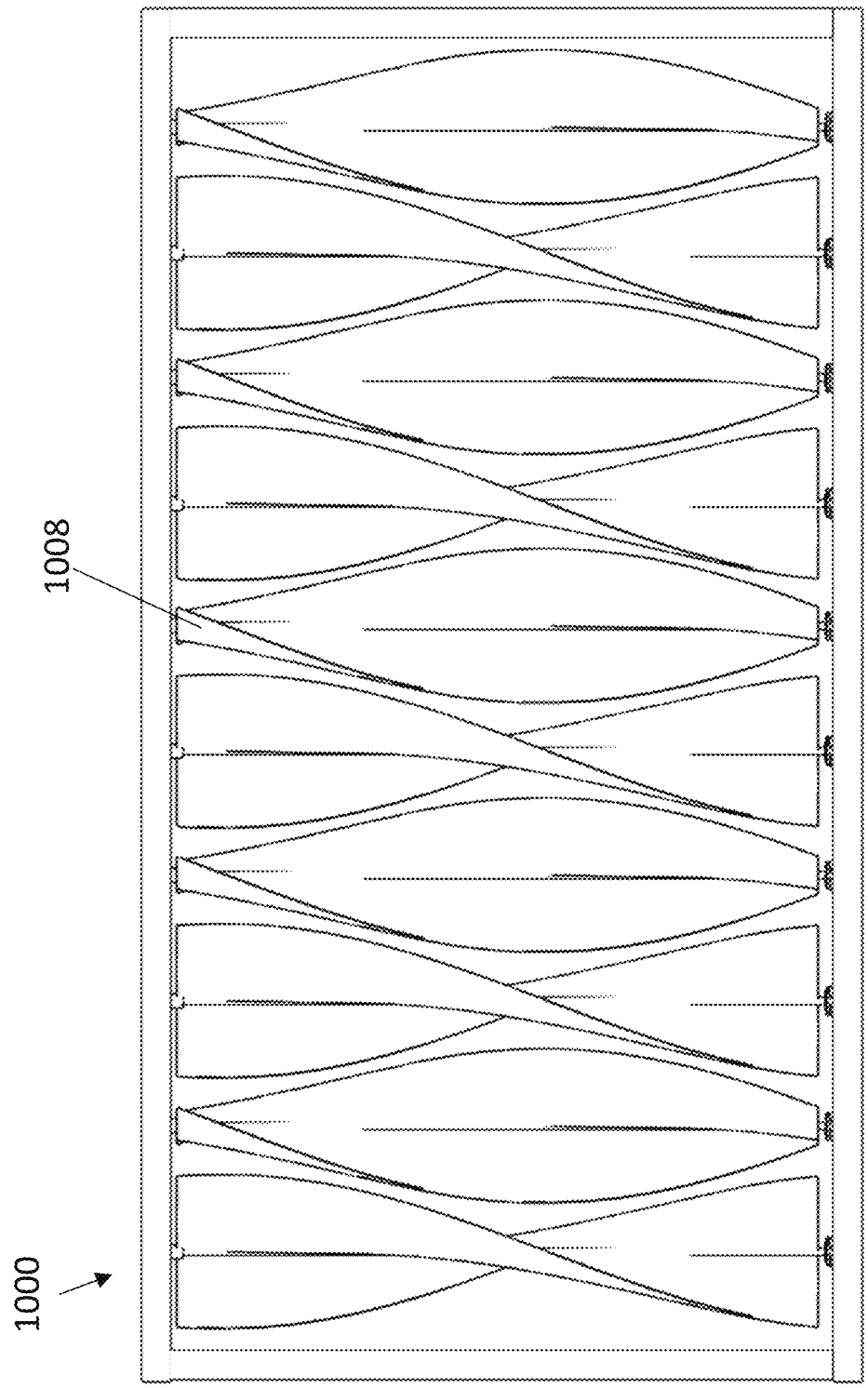
FIG. 10 depicts an alternative blade design according to one embodiment of the wind turbine wall.

FIG. 10 illustrates an embodiment of wind turbine wall 1000 where blades 1008 are helix-shaped. The other aspects (e.g., frame design, type of generator, etc.) may be the same as the above-discussed embodiment(s). The shaft may be reconfigured as needed to accommodate any differences between fans (e.g., for weight considerations, etc.).

Figure 11:
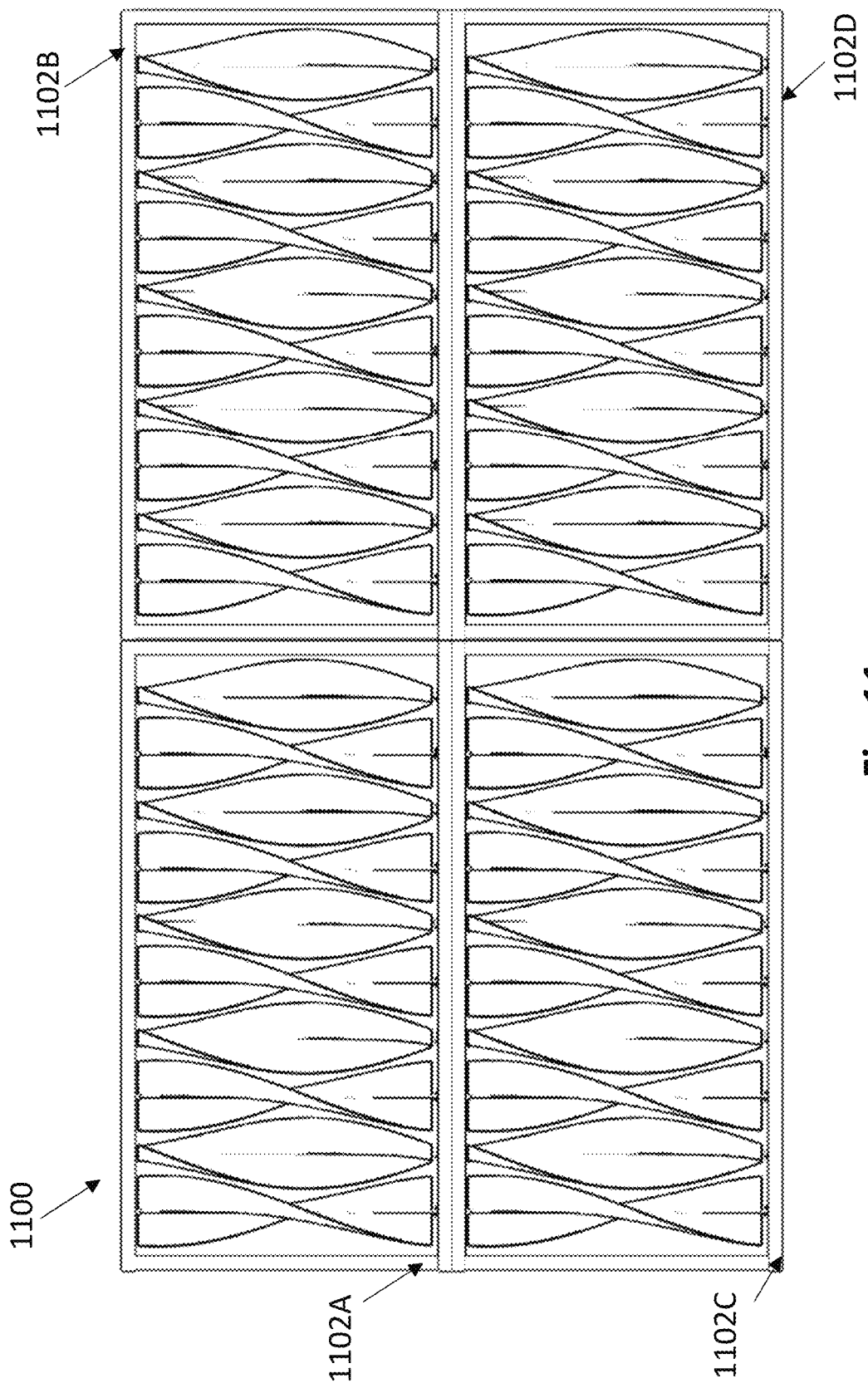
FIG. 11 depicts a stacked arrangement according to the embodiment of FIG. 10.

FIG. 11 illustrates an embodiment where a plurality of wind turbine walls are stacked together. The stacked configuration 1100 represents, for example, four frames 1102A, 1102B, 1102C and 1102D. Such a multi-frame configuration may require additional modifications to the power circuitry. Additionally, adjacent frames may have added coupling hardware for additional structural integrity. For example, the electrical output from each frame may be coupled together, or remain as four or more separate outputs. While four frames are shown, any number of frames can make up the combined assembly.

Figure 12:
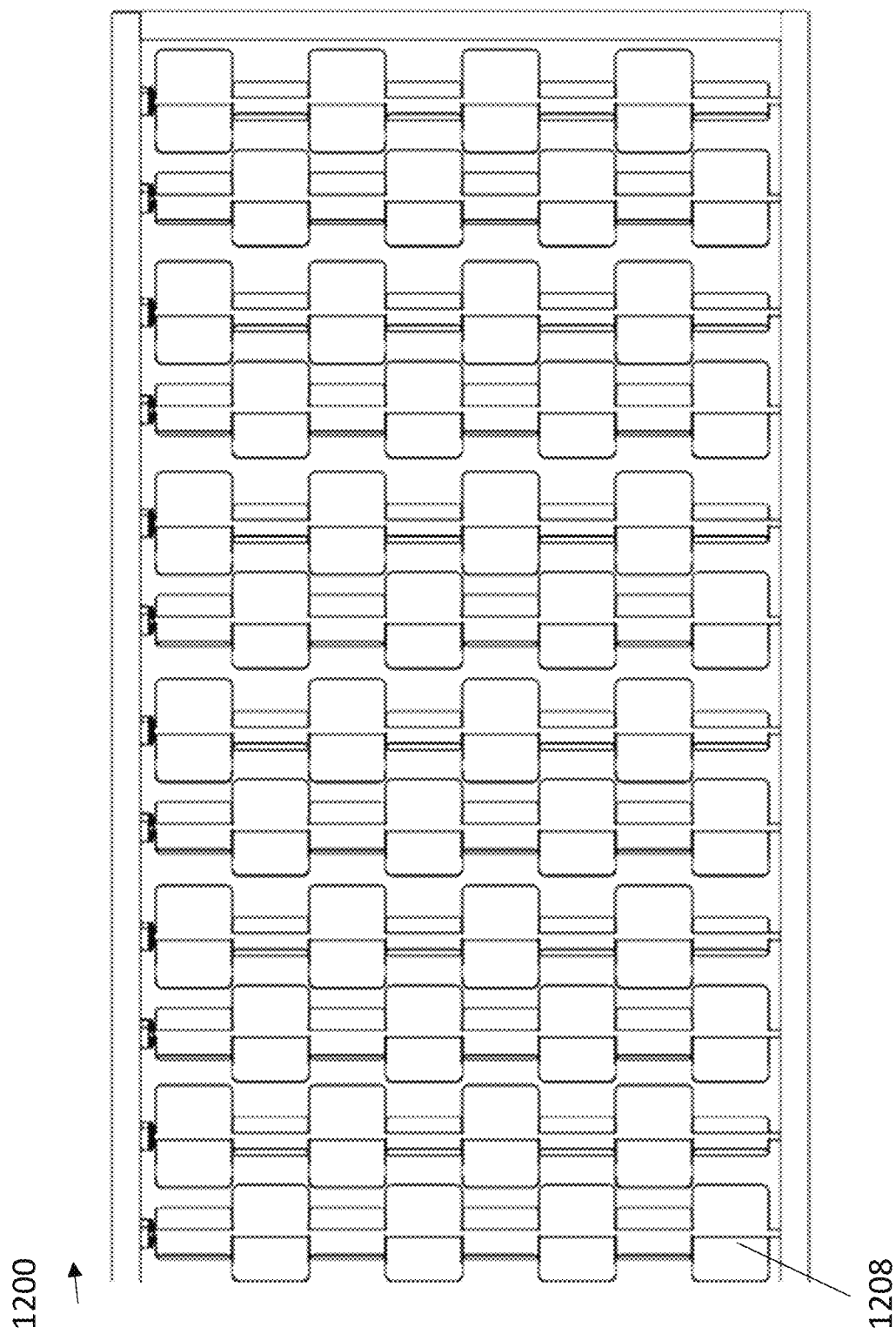
FIG. 12 illustrates an alternative blade design according to one embodiment of the wind turbine wall.
Figure 13:
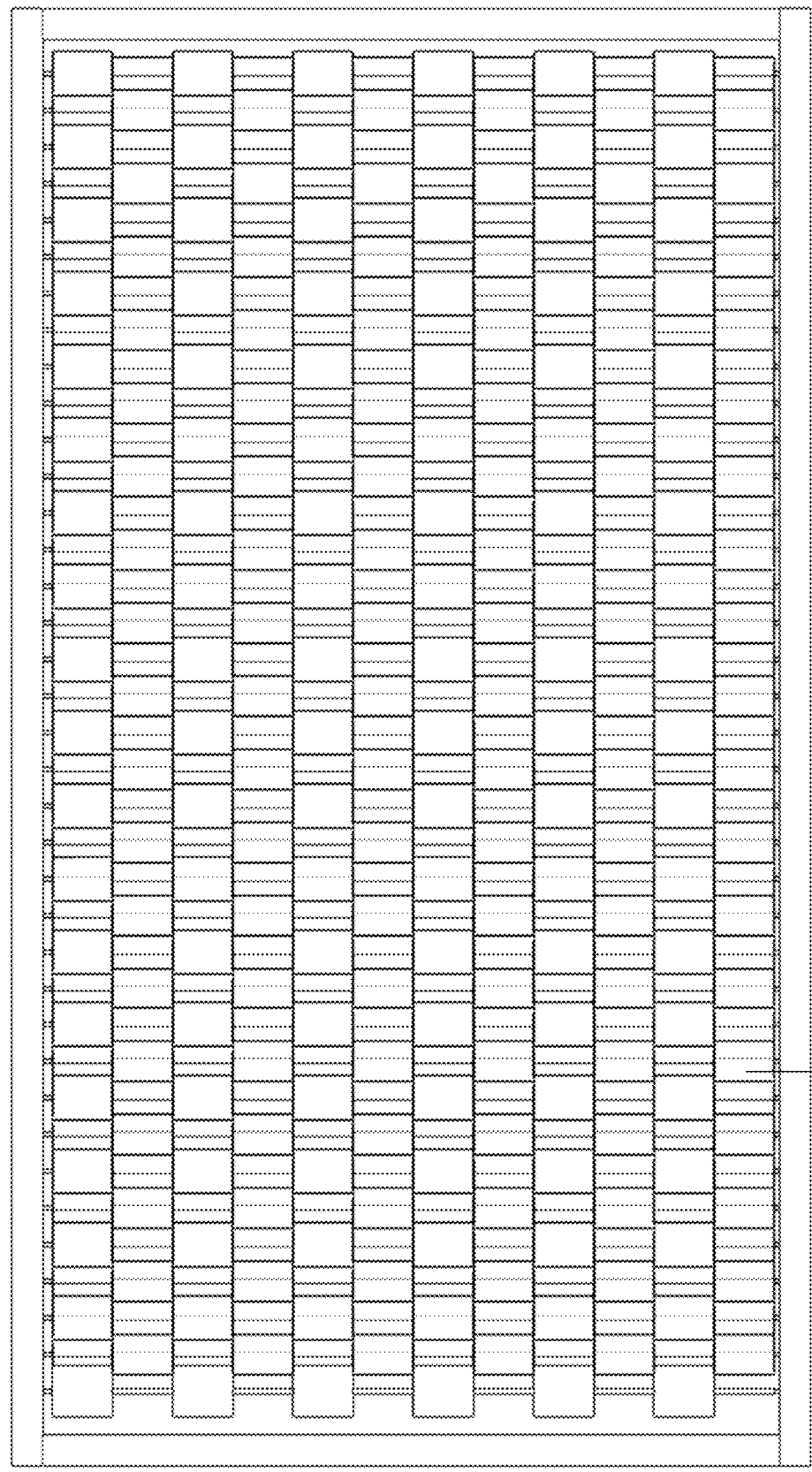
FIG. 13 illustrates an alternative blade design according to one embodiment of the wind turbine wall.

FIGS. 12 and 13 illustrate additional embodiments having different blade shapes and/or different amounts of turbine assemblies. The wind turbine wall 1200 in FIG. 12 includes blades 1208 comprising an "S"-type design (e.g., similar to that shown in FIG. 7), whereas wind turbine wall 1300 in FIG. 13 includes blades 1308 of a smaller, squared-off design. These are mere examples of different blade shapes that can be used. The blades may comprise any shape suitable to realize the desired airflow and wind capture properties (e.g., when considering various aerodynamics aspects including drag, etc.). As discussed, the blades in general comprise some degree of curvature (e.g., S-shaped, helix-shaped, etc.). For example, in the context of vertical axis wind turbines, the blades may be of the type used in Savonius or Darrieus wind turbines. Savonius-type blades are considered to be drag-driven blades, whereas Darrieus-type blades are considered to be lift-driven. Alternatively, the blades need not be curved or twisted, and may instead be straight blades.

Further regarding the shafts (e.g., 106, 206, 506, 606) and generators (e.g., 616), in one embodiment each shaft includes a generator that may be coupled in a direct or indirect manner to the shaft, or the shaft may be coupled to other bearing/linkage assemblies in the lower frame portion of the frame. For example, each shaft may have a portion that terminates in a respective generator located under each shaft. Each generator will generate a corresponding output based on the amount of rotation of the shaft (caused by the blades catching the wind) and the specifications of the generator. The generators used in conjunction with the shafts may comprise DC or AC generators. The AC generators may be synchronous or asynchronous. The type of generator used may vary depending on any particular installation of the device and the desired output power. For example, in the case of using DC generators, the DC voltage generated by the wind turbines of the device may be stored in a battery or bank of batteries. In the case of using AC generators, the AC output from each respective generator (e.g., three-phase power) may be converted to a common DC voltage. Because the frequency of the power will depend on the rotational velocity of the turbines, the output of an AC generator will generally be variable-frequency AC. In order to increase the utility of such variable output(s) from the generator(s), there may be conversion via rectification circuitry including diodes and the like and other microprocessors/controllers and the like, which rectifies the variable-frequency AC current and voltage into DC power. The DC power may then be transformed into AC that matches the local electrical grid. In any embodiment where a battery is utilized, the battery can be used as a power source for the powering of various downstream appliances, equipment, etc. For example, the battery can be part of an assembly that comprises inverter circuitry, such that the DC output of the battery is converted to a desirable AC output (e.g., 120V, 60 Hz). In the case where the battery is fully charged (e.g., at capacity) and the rotating shafts are still generating power, the excess power may be routed to a diversion assembly, such as a diversion load that dissipates the excess power as heat. Or there can be a secondary (power) assembly that is configured for other utilization of the excess power that is unable to be utilized by the primary power assembly, such as a secondary assembly which is configured as a direct feed back to the local electrical grid. In any case, there may be additional circuitry present to protect, condition and/or otherwise manage the voltage generated by the generators so to protect downstream elements (e.g., such as the downstream battery for storing the generated power), and/or to have uniform, clean power throughout the system. Such protection circuitry may comprise undercharge or overcharge protection circuitry for protecting the downstream battery. For example, circuitry components that compare various (e.g., reference) voltages to other (e.g., system) voltages may be used to make determinations relative to overcharge/undercharge aspects.

As discussed, the power conversion may comprise an AC to DC to AC conversion. For example, a diode bridge may be used to perform AC to DC rectification, and a transformer may be used for DC to AC conversion. In this way, the overall power output from the wall may be interfaced with the electrical grid so that a user of the wall can take benefit of any such savings with respect to selling power back to the grid, etc.

The wind turbine wall may be used in a variety of locations, including but not limited to installations in residential housing (e.g., stand-alone homes, condominiums, apartments, etc.), commercial/business developments (e.g., business parks), as road barriers (e.g., installed on an interstate highway), on rooftops, or as part of other more decorative installations (e.g., fencing, etc.). Due to the vertical turbine arrangement, the wall effectively operates as a vertical axis wind turbine(s), which is more wind-direction independent compared to conventional windmills (aka horizontal axis wind turbine). The turbine wall is therefore well-suited for used in urban settings where directionally-fluctuating wind conditions may be prevalent. Because of the shaft/blade configuration, the wall is capable of catching wind in a more versatile manner than conventional wind turbine structures, and as such can generate power in settings where other wind turbine device would be ineffective due to highly variable/turbulent winds. Moreover, the wind turbine wall disclosed herein represents a visually pleasing structure that emits less noise than conventional windmill installations. These features make the wind turbine wall well-suited for residential and other installations where the wall could serve as focal point from a visual design standpoint.

An anemometer (not shown) may be coupled to the frame in order to acquire wind data. The output from the anemometer may be used to analyze wind patterns and determine if gains in power output and/or efficiency could be realized. Similarly, a wind vane (not shown) may be coupled to the frame so that wind data from the vane can be analyzed and used in power output and/or efficiency determinations. Based on the data from the anemometer and/or wind vane, a different set of shafts/blades can be installed in the frame to replace the original shafts/blades if it is determined that the replacement shafts/blades would generate more power and/or be more efficient than original shafts/blades.

The materials and manufacturing for the wind turbine wall may comprise techniques such as injection molding, stamping and extrusion, using materials including plastics, metals, etc. For example, in one embodiment, the blades can be injection molded, whereas the shafts may be extruded. Also envisioned is the use of weather-resistant and other (e.g., powder-coating) finishes. For example, the frame may comprise power-coated steel to provide corrosion resistance. Wood (e.g., pressure/weather treated wood) or other composite materials may also be used for various parts of the wall, for example, in an application where the wall is used as part of fencing. In general, the materials and look of the wall can be tailored so that it is assimilates well into the location/environment in which it installed. These are mere examples of the materials and manufacturing/processing techniques that can be used and are not limiting.

Certain figures (e.g., FIGS. 1, 2, 3a, 3b 4a, 4b, and 5) depict one of the turbines as missing, but this is only for illustrative purposes, and as many continuous turbines as the frame is configured to contain can be joined with the frame. FIGS. 1, 2, 3a, 3b 4a, 4b, and 5 show conventional break lines to indicate that the wall may be any length and width to accommodate the desired amount of turbines and to be of desired overall size dimensions. The term wind as used herein may be generalized as any form of moving air. The wind turbine wall may be referred to as a moving air turbine apparatus.

In another embodiment, the shaft ends do not terminate in generators, but rather are coupled to corresponding linkages capable of translating the rotational motion from the rotating shaft(s) to another (e.g., gear) assembly to utilize the mechanical energy of the gear assembly for other (or similar) purposes (e.g., electrical energy generation).

In the present disclosure, all or part of the units or devices of any system and/or apparatus, and/or all or part of functional blocks in any block diagrams and flow charts may be executed by one or more electronic circuitries including a semiconductor device, a semiconductor integrated circuit (IC) (e.g., such as a processor, CPU, GPU, ASIC etc.), or a large-scale integration (LSI). The LSI or IC may be integrated into one chip and may be constituted through combination of two or more chips. For example, the functional blocks other than a storage element may be integrated into one chip. The integrated circuitry that is called LSI or IC in the present disclosure is also called differently depending on the degree of integrations, and may be called a system LSI, VLSI (very large-scale integration), or VLSI (ultra large-scale integration). For an identical purpose, it is possible to use an FPGA (field programmable gate array) that is programmed after manufacture of the LSI, or a reconfigurable logic device that allows for reconfiguration of connections inside the LSI or setup of circuitry blocks inside the LSI. Any database/recording medium/storage medium or the like referenced herein can be embodied as one or more of ROMs, RAMs, optical disks, hard disk drives, other solid-state memory, servers, cloud storage, used in isolation or in combination, and so on and so forth. Furthermore, part or all of the functions or operations of units, devices or parts or all of devices can be executed by software processing (e.g., coding, algorithms, etc.). The software is recorded in a non-transitory computer-readable recording medium, such as one or more ROMs, RAMs, optical disks, hard disk drives, solid-state memory, servers, cloud storage, and so on and so forth, having stored thereon executable instructions which can be executed to carry out the desired processing functions and/or circuit operations. For example, when the software is executed by a processor, the software causes the processor and/or a peripheral device to execute a specific function within the software. The system/method/device of the present disclosure may include (i) one or more non-transitory computer-readable recording mediums that store the software, (ii) one or more processors (e.g., for executing the software or for providing other functionality), and (iii) a necessary hardware device (e.g., a hardware interface).

The embodiments were chosen and described in order to best explain the principles of the disclosure and its practical application to thereby enable others skilled in the art to best utilize the disclosure in various embodiments and with various modifications as are suited to the particular use contemplated. Aspects of the disclosed embodiments may be mixed to arrive at further embodiments within the scope of the invention.

While the invention has been described above in relation to its example embodiments, various modifications may be made thereto that still fall within the invention's scope. These and other modifications to the invention will be recognizable upon review of the teachings herein.

Sample claims of various inventive aspects of the disclosed invention, not to be considered as exhaustive or limiting, all of which are fully described so as to satisfy the written description, enablement, and best mode requirement of the Patent Laws, are as follows below.

What is claimed is:

1. A method of generating electricity with an air moving apparatus, the method comprising:
    providing a first frame of the air moving apparatus, wherein the first frame comprises top and bottom sides spaced apart by opposite vertical sides, a plurality of shafts spaced apart from one another along and extending between the top and bottom sides of the first frame and parallel to the vertical sides of the first frame, each shaft configured to rotate about a respective shaft axis within the first frame, each respective shaft having a plurality of blades, the plurality of blades arranged and configured to interact with moving air to cause rotational movement of the respective shaft, each of the shafts being operatively coupled to a generator so as to be arranged as a shaft/generator pair, each shaft/generator pair configured such that the generator converts rotational movement of the shaft about the shaft axis to electrical energy, the first frame further including electrical components configured to convert the electrical energy generated by the generator of each shaft to an electrical power output associated with each generator shaft pair, the electrical components comprising a processor with memory;
    providing a second frame of the moving air turbine apparatus, wherein the second frame comprises top and bottom sides spaced apart by opposite vertical sides, a plurality of shafts being spaced apart from one another along and extending between the top and bottom sides of the second frame and parallel to the vertical sides of the second frame, each shaft being configured to rotate about a respective shaft axis within the second frame, each respective shaft having a plurality of blades, the plurality of blades arranged and configured to interact with moving air to cause rotational movement of the respective shaft, each of the shafts being operatively coupled to a generator so as to be arranged as a shaft/generator pair, each shaft/generator pair configured such that the generator converts rotational movement of the shaft about the shaft axis to electrical energy, the second frame further including electrical components configured to convert the electrical energy generated by the generator of each shaft to an electrical power output associated with each generator shaft pair, the electrical components comprising a processor with memory; and
    operatively connecting a vertical side of the first frame to a vertical side of the second frame;
    enabling the processor and the memory associated with the first frame to: (i) manage the electrical power output associated with each generator shaft pair of the first frame; (ii) compare the electrical power output associated with one generator shaft pair with the electrical power output of another generator shaft pair in the first frame; and (iii) provide uniform electrical power output from each of the generator shaft pairs of the first frame to downstream elements; and
    enabling the processor and the memory associated with the second frame to: (i) manage the electrical power output associated with each generator shaft pair of the second frame; (ii) compare the electrical power output associated with one generator shaft pair with the electrical power output of another generator shaft pair in the second frame; and (iii) provide uniform electrical power output from each of the generator shaft pairs of the second frame to downstream elements.

2. The method of claim 1 further comprising coupling the uniform electrical output from each of the generator shaft pairs of the first frame with uniform electrical output from each of the generator shaft pairs of the second frame.

3. The method of claim 2 further comprising aligning the coupled electrical output from the first frame and the second frame with direct feedback to a local electrical grid.

4. The method of claim 1 wherein the step of providing a first frame with the plurality of blades on the shaft comprises providing injection molded Savonious-type blades in a vertical stack.

5. The method of claim 1 wherein the step of providing the first frame with the shaft and the plurality of blades includes providing the shaft with integrally formed Savonious-type blades in a vertical stack on the shaft.

6. The method of claim 1 wherein the step of providing a second frame with the plurality of blades on the shaft comprises providing injection molded Savonious-type blades in a vertical stack.

7. The method of claim 1 wherein the step of providing the second frame with the shaft and the plurality of blades includes providing the shaft with integrally formed Savonious-type blades in a vertical stack on the shaft.

8. The method of claim 1 wherein the step of providing the first frame with the shaft and plurality of blades includes arranging the shafts in a spaced apart side-by-side relationship so that the blades of one shaft are configured with a cooperative airflow relationship relative to the blades of an immediately adjacent shaft.

9. The method of claim 1 wherein the step of providing the second frame with the shaft and plurality of blades includes arranging the shafts in a spaced apart side-by-side relationship so that the blades of one shaft are configured with a cooperative airflow relationship relative to the blades of an immediately adjacent shaft.

10. The method of claim 1 wherein the step of providing the electrical components associated with the first frame includes providing a hardware interface adapted and configured to interface with at least one of servers and cloud storage.

11. The method of claim 1 wherein the step of providing the electrical components associated with the second frame includes providing a hardware interface adapted and configured to interface with at least one of servers and cloud storage.

12. A method of generating electricity with an air moving apparatus, the method comprising:

providing a first frame of the air moving apparatus, wherein the first frame comprises first and second opposite sides extending along a length of the frame, and first and second opposite sides extending along a width of the first frame, a plurality of shafts spaced apart from one another along and extending along the length of first frame and parallel to the width of the first frame, each shaft configured to rotate about a respective shaft axis within the first frame, each respective shaft having a plurality of blades, the plurality of blades arranged and configured to interact with moving air to cause rotational movement of the respective shaft, each of the shafts being operatively coupled to a generator so as to be arranged as a shaft/generator pair, each shaft/generator pair configured such that the generator converts rotational movement of the shaft about the shaft axis to electrical energy, the first frame further including electrical components configured to convert the electrical energy generated by the generator of each shaft to an electrical power output associated with each generator shaft pair, the electrical components comprising a processor with memory;

providing a second frame of the moving air turbine apparatus, wherein the second frame comprises first and second opposite sides extending along a length of the second frame, and first and second opposite sides extending along a width of the second frame, a plurality of shafts spaced apart from one another along and extending along the length of second frame and parallel to the width of the second frame, each shaft being configured to rotate about a respective shaft axis within the second frame, each respective shaft having a plurality of blades, the plurality of blades arranged and configured to interact with moving air to cause rotational movement of the respective shaft, each of the shafts being operatively coupled to a generator so as to be arranged as a shaft/generator pair, each shaft/generator pair configured such that the generator converts rotational movement of the shaft about the shaft axis to electrical energy, the second frame further including electrical components configured to convert the electrical energy generated by the generator of each shaft to an electrical power output associated with each generator shaft pair, the electrical components comprising a processor with memory; and operatively connecting one of the first and second width sides of the first frame to one of the first and second width sides of the second frame;

enabling the processor and the memory associated with the first frame to: (i) manage the electrical power output associated with each generator shaft pair of the first frame; (ii) compare the electrical power output associated with one generator shaft pair with the electrical power output of another generator shaft pair in the first frame; and (iii) provide uniform electrical power output from each of the generator shaft pairs of the first frame to downstream elements; and enabling the processor and the memory associated with the second frame to: (i) manage the electrical power output associated with each generator shaft pair of the second frame; (ii) compare the electrical power output associated with one generator shaft pair with the electrical power output of another generator shaft pair in the second frame; and (iii) provide uniform electrical power output from each of the generator shaft pairs of the second frame to downstream elements.

13. The method of claim 12 further comprising coupling the uniform electrical output from each of the generator shaft pairs of the first frame with uniform electrical output from each of the generator shaft pairs of the second frame.

14. The method of claim 13 further comprising aligning the coupled electrical output from the first frame and the second frame with direct feedback to a local electrical grid.

15. The method of claim 12 further comprising:

providing a third frame of the moving air turbine apparatus, wherein the third frame comprises first and second opposite sides extending along a length of the third frame, and first and second opposite sides extending along a width of the third frame, a plurality of shafts spaced apart from one another along and extending along the length of third frame and parallel to the width of the third frame, each shaft being configured to rotate about a respective shaft axis within the third frame, each respective shaft having a plurality of blades, the plurality of blades arranged and configured to interact with moving air to cause rotational movement of the respective shaft, each of the shafts being operatively coupled to a generator so as to be arranged as a shaft/generator pair, each shaft/generator pair configured such that the generator converts rotational movement of the shaft about the shaft axis to electrical energy, the third frame further including electrical components configured to convert the electrical energy generated by the generator of each shaft to an electrical power output associated with each generator shaft pair, the electrical components comprising a processor with memory; and operatively connecting one of the first and second width sides of the third frame to the other of the first and second width sides of the second frame so the second frame is disposed between the first frame and the third frame; and enabling the processor and the memory associated with the third frame to: (i) manage the electrical power output associated with each generator shaft pair of the third frame; (ii) compare the electrical power output associated with one generator shaft pair with the electrical power output of another generator shaft pair in the third frame; and (iii) provide uniform electrical power output from each of the generator shaft pairs of the third frame to downstream elements.

16. The method of claim 15 further comprising coupling the uniform electrical output from each of the generator shaft pairs of the first frame with the uniform electrical output from each of the generator shaft pairs of the second frame and with the uniform electrical output from each of the generator shaft pairs of the third frame.

17. The method of claim 16 further comprising aligning the coupled electrical output from the first frame, the second frame, and the third frame with direct feedback to a local electrical grid.

18. The method of claim 15 wherein the step of providing the electrical components associated with the third frame includes providing a hardware interface adapted and configured to interface with at least one of servers and cloud storage.

19. The method of claim 15 wherein the step of operatively connecting one of the first and second width sides of the third frame to the other of the first and second width sides of the second frame so the second frame is disposed between the first frame and the third frame comprises aligning the length sides of the first, second and third frames in parallel.

20. The method of claim 12 wherein the step of providing the electrical components associated with the first frame includes providing a hardware interface adapted and configured to interface with at least one of servers and cloud storage.

21. The method of claim 12 wherein the step of providing the electrical components associated with the second frame includes providing a hardware interface adapted and configured to interface with at least one of servers and cloud storage.

* * * * *